(12) United States Patent
Thomas

(10) Patent No.: US 9,352,459 B2
(45) Date of Patent: May 31, 2016

(54) BROKEN BOLT EXTRACTOR

(71) Applicant: Marvin Thomas, St. Louis, MO (US)

(72) Inventor: Marvin Thomas, St. Louis, MO (US)

( * ) Notice: Subject to any disclaimer, the term of this patent is extended or adjusted under 35 U.S.C. 154(b) by 239 days.

(21) Appl. No.: 14/245,436

(22) Filed: Apr. 4, 2014

(65) Prior Publication Data

US 2015/0283626 A1   Oct. 8, 2015

(51) Int. Cl.
| | |
|---|---|
| *B23B 51/10* | (2006.01) |
| *B23B 51/00* | (2006.01) |
| *B25B 27/18* | (2006.01) |
| *B23B 51/08* | (2006.01) |

(52) U.S. Cl.
CPC ............. *B25B 27/18* (2013.01); *B23B 51/08* (2013.01); *B23B 2251/64* (2013.01)

(58) Field of Classification Search
CPC .... B25B 27/18; B25B 51/0081; B25B 51/08; B25B 2251/242; B25B 2251/64
See application file for complete search history.

(56) References Cited

U.S. PATENT DOCUMENTS

| | | | | |
|---|---|---|---|---|
| 1,863,045 | A * | 6/1932 | Randall et al. | B25B 27/18 81/441 |
| 2,752,671 | A * | 7/1956 | Alyea | B25B 27/18 29/240 |
| 3,654,690 | A * | 4/1972 | Hardin | B25B 27/18 29/240 |
| 4,078,458 | A * | 3/1978 | Berendzen | B23B 51/08 29/240 |
| 4,350,064 | A * | 9/1982 | Markle | B25B 13/481 81/177.2 |
| 4,536,108 | A * | 8/1985 | Saxton | B23B 51/02 408/226 |
| 4,604,917 | A * | 8/1986 | Polonsky | B25B 27/18 7/158 |
| 4,777,850 | A * | 10/1988 | Polonsky | B25B 27/18 408/226 |
| 4,831,902 | A | 5/1989 | McClure | |
| 5,031,487 | A | 7/1991 | Polonsky | |
| 5,251,516 | A * | 10/1993 | Desaulniers | B28B 27/18 7/158 |
| 6,868,756 | B2 * | 3/2005 | Kozak | B25B 27/18 81/441 |
| 7,152,509 | B2 * | 12/2006 | McCalley, Jr. | B25B 27/18 81/441 |
| 7,971,508 | B2 * | 7/2011 | Kozak | B25B 27/18 81/441 |
| 8,215,206 | B2 * | 7/2012 | Kozak | B25B 27/18 81/441 |
| 8,276,482 | B2 * | 10/2012 | Kozak | B23B 51/00 81/441 |
| 8,485,066 | B2 * | 7/2013 | Kozak | B23B 51/00 81/441 |
| 8,567,028 | B2 * | 10/2013 | Shevela | B25B 27/0035 29/235 |
| 8,739,658 | B2 * | 6/2014 | Kozak | B23B 51/00 81/441 |
| 8,955,415 | B2 * | 2/2015 | Lin | B25B 27/18 81/441 |
| 2002/0152599 | A1 * | 10/2002 | Pai | B25B 27/18 29/426.1 |
| 2003/0136228 | A1 * | 7/2003 | Liu | B25B 27/18 81/53.2 |
| 2010/0154185 | A1 * | 6/2010 | Schallert | B25B 27/18 29/270 |
| 2014/0238202 | A1 * | 8/2014 | Roscosky | B25B 27/18 81/53.2 |
| 2015/0075331 | A1 * | 3/2015 | Catalano | B25B 27/18 81/53.2 |

* cited by examiner

*Primary Examiner* — David B Thomas
(74) *Attorney, Agent, or Firm* — David H. Chervitz

(57) ABSTRACT

A broken bolt extractor is disclosed which comprises a counter clockwise cutting tip section for drilling a bore into a broken bolt, the cutting tip section being tapered, an intermediate gripping section having a gripping edge for gripping a side of the bore drilled into the broken bolt, the intermediate gripping section being tapered, and a shaft section for attachment to a tool for rotating the extractor.

20 Claims, 6 Drawing Sheets

BROKEN BOLT EXTRACTOR

BACKGROUND

This disclosure relates generally to a tool for removal of a broken bolt, and more particularly to a broken bolt extractor for removing a portion of a threaded fastener that remains lodged in a threaded bore.

Bolts, such as bolts having sizes M8 to M14, have a bolt head and a threaded bolt stud or body. Due to the construction of a bolt, the bolt head may become separated or break off from the threaded bolt stud when attempting to remove the bolt. If this occurs then separation of the bolt head from the stud will leave the stud or a portion of a stud in a threaded bolt bore. Removing the broken bolt or stud is a cumbersome and difficult process. There have been several devices or methods developed in an effort to assist in removing the broken bolt. For example, one prior device requires that a separate drill bit be used to drill a hole in the stud. Once a hole is drill to a sufficient depth in the stud a second tool is used to be inserted into the drilled hole to extract the stud portion from the bore within which the stud portion is lodged or stuck. One problem associated with this process is that the drill bit breaks during the drilling process and becomes lodged in the stud. Instead of solving a problem another problem is encountered in that now the broken drill bit needs to be removed. Further, using a separate drill bit sometimes will rotate the stud body deeper into the threaded bore. This makes removal of the broken bolt stud even more difficult. Another prior device combines a drill bit with a bolt stud extractor in a single tool. However, this prior device requires that the bolt stud extractor be placed on a threaded tool shaft and the bolt stud extractor rotates during use until it becomes lodged in the stud to be extracted. One problem associated with this use of this device is that it is capable of coming off the threaded tool shaft during use. If this occurs, then the problem of having to remove the bolt stud extractor lodged in the stud body is encountered. Again, not only is the broken bolt not removed but the broken tool now has to be removed. It would be desirable to avoid encountering a situation in which the tool is required to be extracted from the broken bolt. Further, the drill bit portion of this device is very small and may not drive deep enough into the broken bolt section for the extractor to grip enough of the broken bolt section.

The present disclosure is designed to obviate and overcome many of the disadvantages and shortcomings experienced with prior bolt extractors. Moreover, the present disclosure is related to a broken bolt extractor that can be easily manipulated or employed to remove broken bolts of various sizes. The broken bolt extractor of the present disclosure is also simple to use due to the extractor only being a single tool or device that does not require any moving parts attached to the extractor.

SUMMARY

In one form of the present disclosure, a broken bolt extractor is disclosed which comprises a counter clockwise cutting tip section for drilling a bore into a broken bolt, the cutting tip section being tapered, an intermediate gripping section having a gripping edge for gripping a side of the bore drilled into the broken bolt, the intermediate gripping section being tapered, and a shaft section for attachment to a tool for rotating the extractor.

In another form of the present disclosure, a broken bolt extractor comprises a counter clockwise cutting tip section for drilling a bore into a broken bolt, the cutting tip section being tapered, an intermediate gripping section having a number of gripping edges disposed radially about the intermediate gripping section, the gripping edges for gripping a side of the bore drilled into the broken bolt, the intermediate gripping section being tapered, and a shaft section for attachment to a tool for rotating the extractor.

In still another form of the present disclosure, a broken bolt extractor comprises a counter clockwise cutting tip section for drilling a bore into a broken bolt, the cutting tip section being tapered, an intermediate gripping section having a number of gripping edges disposed radially about the intermediate gripping section, the gripping edges for gripping a side of the bore drilled into the broken bolt, the intermediate gripping section being tapered and the grinding edges being straight, and a shaft section for attachment to a tool for rotating the extractor.

In light of the foregoing comments, it will be recognized that the broken bolt extractor of the present disclosure is of simple construction and design and which can be easily employed with highly reliable results.

The present disclosure provides a broken bolt extractor that can remove a portion of a bolt left in a threaded bore.

The present disclosure provides a broken bolt extractor that is easy to use, store, and transport to a work site.

The present disclosure provides a broken bolt extractor that is lightweight, compact, and durable.

The present disclosure also provides a broken bolt extractor that can be constructed using readily available materials.

The present disclosure also provides a broken bolt extractor that allows a broken bolt to be removed in a single operation.

The present disclosure is also directed to a broken bolt extractor that has a cutting bit section that is long enough to drill deep into a broken bolt section.

The present disclosure further provides a broken bolt extractor that is of a single piece construction and does not have any moving parts threaded to the broken bolt extractor.

These and other advantages of the present disclosure will become apparent after considering the following detailed specification in conjunction with the accompanying drawings, wherein:

DETAILED DESCRIPTION OF THE PREFERRED EMBODIMENTS

Figure 1:
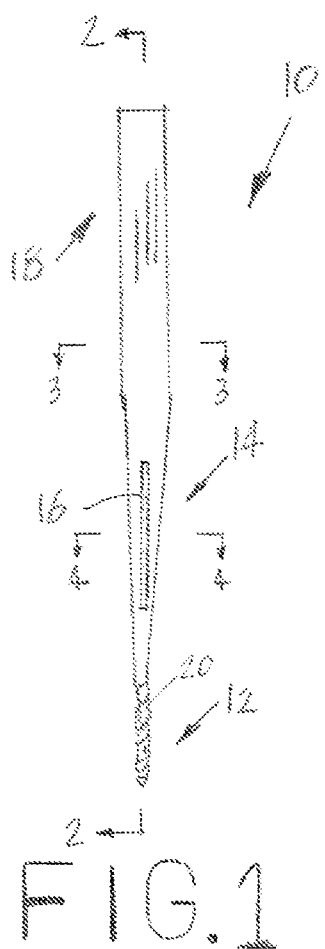
FIG. 1 is a perspective view of a broken bolt extractor constructed according to the present disclosure.

Referring now to the drawings, wherein like numbers refer to like items, number 10 identifies a preferred embodiment of a broken bolt extractor constructed according to the present disclosure. Referring now to FIG. 1, the broken bolt extractor 10 is shown to comprise a counter clockwise cutting tip section 12, an intermediate gripping section 14 having a gripping edge 16, and a shaft section 18 for attachment to a tool (not shown) for rotating the broken bolt extractor 10. The tip section 12 is tapered and preferably is one half inch long in length. This length ensures that the cutting tip section 12 will cut into a broken bolt section deep enough before the intermediate gripping section 14 enters into a bore that has been drilled by the cutting tip section 12. The cutting tip section 12 has left-handed or counter clockwise cutting threads 20 formed therein. Since most, if not all, broken bolt portions to be removed have right hand or clockwise threads, the counter clockwise cutting threads 20 will cut into the broken bolt portion without tighten the portion further in place. The intermediate gripping section 14 is tapered and preferably is one and a half inches long in length. The shaft section 18 is straight and may have a preferred length of one and a half inches. It is also possible that the shaft section 18 may be squared off or include a hexagonal socket end to facilitate insertion into a chuck of a tool.

Figure 2:
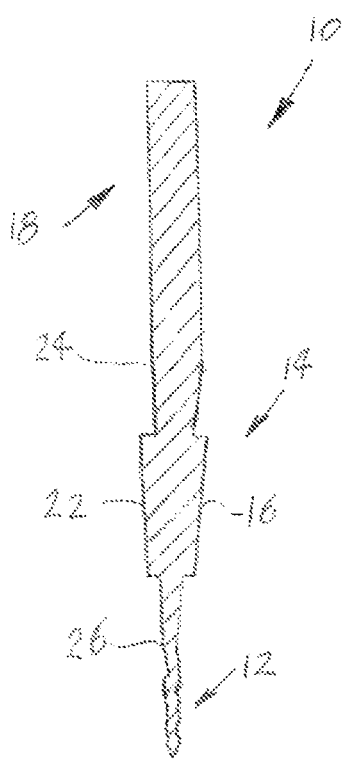
FIG. 2 is a cross-sectional view of the broken bolt extractor shown in FIG. 1 taken along the plane of line 2-2.

FIG. 2 illustrates a cross-sectional view of the broken bolt extractor 10. The broken bolt extractor 10 has the counter clockwise cutting tip section 12, the intermediate gripping section 14 having the gripping edge 16 and also another gripping edge 22, and the shaft section 18. The gripping edges 16 and 22 are positioned radially around the intermediate gripping section 14. Although two gripping edges 16 and 22 are shown, it is possible to have more gripping edges radially positioned on the intermediate gripping section 14. The intermediate gripping section 14 is tapered between the shaft section 18 and the cutting tip section 12. The intermediate gripping section 14 tapers from its widest point 24, where the intermediate gripping section 14 intersects with the shaft section 18, to is narrowest point 26, where the intermediate gripping section 14 intersects with the cutting tip section 12. The gripping edges 16 and 22 each have a length with the length being less than the length of the intermediate gripping section 14.

Figure 3:
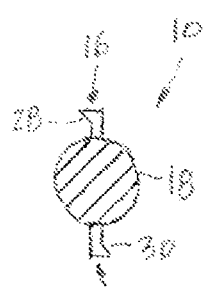
FIG. 3 is an enlarged cross-sectional view of the broken bolt extractor shown in FIG. 1 taken along the plane of line 3-3.

With reference now to FIG. 3, a cross-sectional view of the broken bolt extractor 10 is depicted. The broken bolt extractor 10 is shown with the shaft section 18 having a circular cross-section. As indicated above, although a circular cross-section it is possible to have a different cross-section such as hexagonal or square. Below the shaft section 18 are the gripping edges 16 and 22. The gripping edge 16 comprises a tooth 28 that is used to grip a side of a bore formed in the broken bolt section, as will be explained in further detail herein. The gripping edge 22 also has a tooth 30.

Figure 4:
FIG. 4 is an enlarged cross-sectional view of the broken bolt extractor shown in FIG. 1 taken along the plane of line 4-4.

FIG. 4 is a cross-sectional view of the broken bolt extractor taken at the intermediate gripping section 14. The broken bolt extractor 10 is shown with the intermediate gripping section 14 having a circular cross-section. Although a circular cross-section is illustrated, it is also contemplated that the cross-section may be a different shape or configuration. By way of example only, the cross-section of the intermediate gripping section 14 may be triangular, square, and hexagonal. The gripping edges 16 and 22 are shown having the teeth 28 and 30, respectively.

Figure 5:
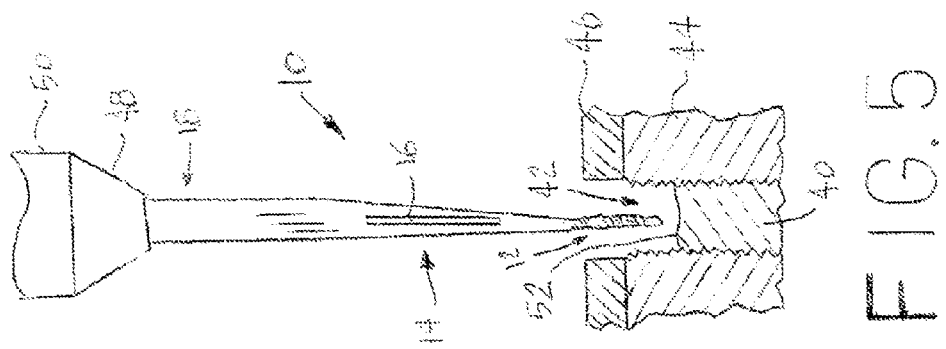
FIG. 5 is a cross-sectional view of the broken bolt extractor being drilled into a broken bolt portion for forming a bore therein.

Referring now to FIG. 5, the broken bolt extractor 10 is shown prior to being drilled into a broken bolt section or stud 40 left or stuck in a threaded bore hole 42 in a support surface 44. Another surface 46 is shown and the surface 46 is typically mated to the support surface 44 by the bolt (not shown) that has been broken. The broken bolt extractor 10 is shown being inserted into a chuck 48 of a power drill 50. The shaft section 18 is mechanically coupled in the chuck 48 to rotate the broken bolt extractor 10. As has been previously discussed, the shaft section 18 may have a socket end (not shown) having flat surfaces, such as a hexagonal shape, that enables the broken bolt extractor 10 to be mechanically gripped within the chuck 48. Also, a hand tool, such as a ratcheting socket wrench, a breaker bar, a nut driver, an open end wrench, or a box end wrench, may be used to rotate the broken bolt extractor 10. If the broken bolt section 40 is right-hand threaded then the broken bolt extractor 10 is rotated in the counterclockwise direction to drill the cutting tip section 12 of the broken bolt extractor 10 into the broken bolt section 40. In this manner, the broken bolt section 40 will not be rotated further into the threaded bore hole 42. As can be appreciated, no prior drilling or preparation to an exposed top surface 52 of the broken bolt section 40 is required even if the exposed top surface 52 has an irregular shape. The broken bolt extractor 10 is also shown having the gripping edge 16 on the intermediate gripping section 14.

Figure 6:
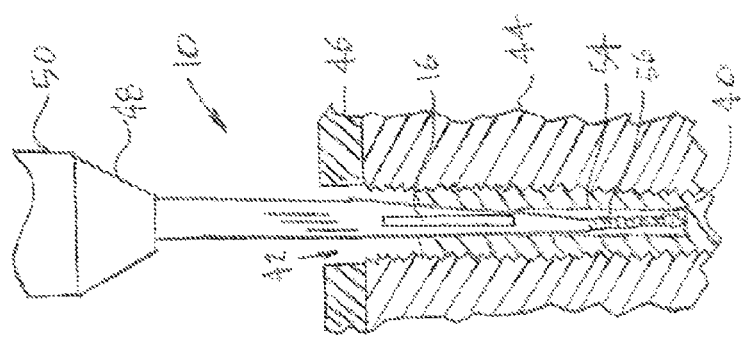
FIG. 6 is a cross-sectional view of the broken bolt extractor being drilled into a broken bolt portion with a gripping edge engaging a side of the broken bolt portion.

FIG. 6 illustrates the broken bolt extractor 10 being drilled into the broken bolt section 40 and the gripping edge 16 gripping into or engaging a side or a wall 54 of a bore 56 formed in the broken bolt section 40 by the cutting tip section 12. As the gripping edge 16 grips the side 54 of the bore 56, the gripping edge 16 will become lodged or locked into the side 54 which will rotate the broken bolt section 40 in a counterclockwise direction. Rotating the broken bolt section 40 in a counterclockwise direction will loosen the broken bolt section 40 from within the threaded bore hole 42. This will remove the broken bolt section 40 from the threaded bore hole 42.

Figure 7:
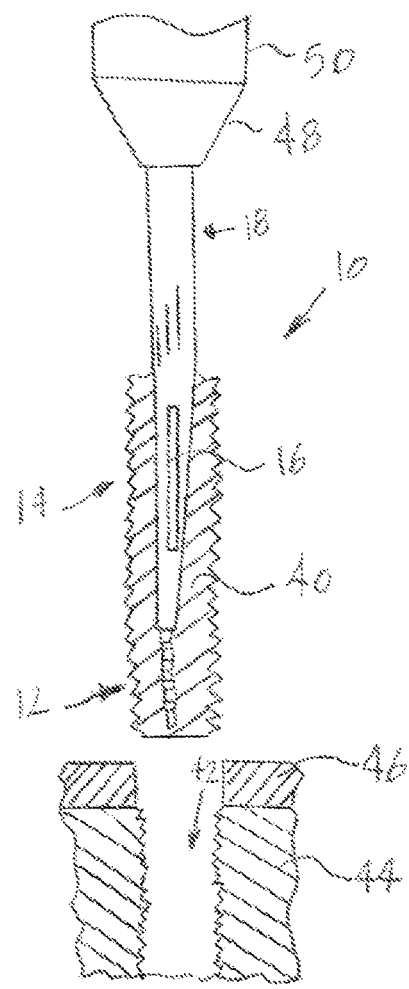
FIG. 7 is a cross-sectional view of the broken bolt extractor removing a broken bolt section completely out of a bore hole.

With particular reference now to FIG. 7, the broken bolt section 40 has been removed from the threaded bore hole 42. The broken bolt section 40 is still engaged with the broken bolt extractor 10 and can be removed therefrom in any suitable manner. For example, the broken bolt section 40 may be placed in a clamp or a vise and the drill 50 may be rotated in the clockwise or right-hand direction and the broken bolt extractor 10 will be rotated out of the broken bolt section 40. Other methods may be used to remove or free the broken bolt section 40 from the broken bolt extractor 10.

As can be appreciated, the broken bolt extractor 10 is used to remove the broken bolt section 40 that has remained in the threaded bore hole 42 after a bolt head (not shown) has broken away from the broken bolt section 40. Once it is determined that the broken bolt section 40 needs to be extracted from the threaded bore hole 42, the broken bolt extractor 10 is placed into the chuck 48 of the drill 50 and secured in place. The cutting tip section 12 of the broken bolt extractor 10 is placed into the threaded bore hole 42 against the exposed top surface 52 of the broken bolt section 40. The drill 50 is operated to rotate the broken bolt extractor 10 in the counterclockwise direction and the cutting tip section 12 drills into the broken bolt section 40 in the counterclockwise direction. By drilling in the counterclockwise direction, the broken bolt section 40 is not tighten further in the threaded bore hole 42. The drilling operation creates the bore 56 within broken bolt section 40. The drilling operation continues and the gripping edges 16 and 22 come into contact with the wall 54 and grip the wall 54. Further rotation of the broken bolt extractor 10 will back out the broken bolt section 40 until the broken bolt section 40 is completely removed from the threaded bore hole 42. Once the broken bolt section 40 is extracted, the broken bolt section 40 may be removed from the broken bolt extractor 10. A new bolt may then be threaded into the threaded bore hole 42. With use of the broken bolt extractor 10, a broken bolt section 40 may be removed from a threaded bore hole 42 by use of a single tool using a single operation.

Preferably, the broken bolt extractor 10 will be constructed of a material such as high carbon steel, high speed steel, cobalt steel alloys, tungsten carbide, or polycrystalline diamond so that the extractor 10 is easy to handle and use. Other materials or combination of materials may be used to construct the broken bolt extractor 10. The broken bolt extractor 10 may also be coated black oxide, titanium nitride, titanium aluminum nitride, titanium carbon nitride, and zirconium nitride. Further, other coatings may be used to coat the broken bolt extractor 10 to extend the life of the extractor 10.

From all that has been said, it will be clear that there has thus been shown and described herein a broken bolt extractor which fulfills the various objects and advantages sought therefor. It will be apparent to those skilled in the art, however, that many changes, modifications, variations, and other uses and applications of the subject broken bolt extractor are possible and contemplated. All changes, modifications, variations, and other uses and applications which do not depart from the spirit and scope of the disclosure are deemed to be covered by the disclosure, which is limited only by the claims which follow.

What is claimed is:

1. A broken bolt extractor comprising:
   a counter clockwise cutting tip section for drilling a bore into a broken bolt, the cutting tip section being tapered;
   an intermediate gripping section having a gripping edge for gripping a side of the bore drilled into the broken bolt, the intermediate gripping section being tapered; and
   a shaft section for attachment to a tool for rotating the extractor.

2. The broken bolt extractor of claim 1 wherein the shaft section is straight.

3. The broken bolt extractor of claim 1 wherein the intermediate gripping section has a length and the shaft section has a length and the lengths are equal.

4. The broken bolt extractor of claim 3 wherein the length of the intermediate gripping section is one and a half inches.

5. The broken bolt extractor of claim 3 wherein the length of the shaft section is one and a half inches.

6. The broken bolt extractor of claim 1 wherein the cutting tip section has a length and the intermediate gripping section has a length and the length of the intermediate gripping section is greater than the length of the cutting tip section.

7. The broken bolt extractor of claim 6 wherein the length of the cutting tip section is half an inch.

8. A broken bolt extractor comprising:
   a counter clockwise cutting tip section for drilling a bore into a broken bolt, the cutting tip section being tapered;
   an intermediate gripping section having a number of gripping edges disposed radially about the intermediate gripping section, the gripping edges for gripping a side of the bore drilled into the broken bolt, the intermediate gripping section being tapered; and
   a shaft section for attachment to a tool for rotating the extractor.

9. The broken bolt extractor of claim 8 wherein the number of grinding edges is four.

10. The broken bolt extractor of claim 8 wherein the shaft section is straight.

11. The broken bolt extractor of claim 8 wherein the intermediate gripping section has a length and the shaft section has a length and the lengths are equal.

12. The broken bolt extractor of claim 11 wherein the length of the intermediate gripping section is one and a half inches.

13. The broken bolt extractor of claim 11 wherein the length of the shaft section is one and a half inches.

14. The broken bolt extractor of claim 8 wherein the cutting tip section has a length and the intermediate gripping section has a length and the length of the intermediate gripping section is greater than the length of the cutting tip section.

15. The broken bolt extractor of claim 8 wherein the gripping edges each have a length and the intermediate gripping section has a length and the length of the intermediate gripping section is greater than each length of each gripping edge.

16. A broken bolt extractor comprising:
   a counter clockwise cutting tip section for drilling a bore into a broken bolt, the cutting tip section being tapered;
   an intermediate gripping section having a number of gripping edges disposed radially about the intermediate gripping section, the gripping edges for gripping into a side of the bore drilled into the broken bolt, the intermediate gripping section being tapered and the grinding edges being straight; and
   a shaft section for attachment to a tool for rotating the extractor.

17. The broken bolt extractor of claim 16 wherein the intermediate gripping section has a length and the shaft section has a length and the lengths are equal.

18. The broken bolt extractor of claim 17 wherein the length of the intermediate gripping section is one and a half inches and the length of the shaft section is one and a half inches.

19. The broken bolt extractor of claim 16 wherein the cutting tip section has a length and the intermediate gripping section has a length and the length of the intermediate gripping section is greater than the length of the cutting tip section.

20. The broken bolt extractor of claim 16 wherein the gripping edges each have a length and the intermediate gripping section has a length and the length of the intermediate gripping section is greater than each length of each gripping edge.

* * * * *